United States Patent [19]

Adelmann et al.

[11] 4,199,540

[45] Apr. 22, 1980

[54] MODIFIED POLYCARBONATES AND A PROCESS FOR THEIR PREPARATION

[75] Inventors: Siegfried Adelmann; Dieter Margotte; Werner Nouverné, all of Krefeld, Fed. Rep. of Germany

[73] Assignee: Bayer Aktiengesellschaft, Leverkusen, Fed. Rep. of Germany

[21] Appl. No.: 945,150

[22] Filed: Sep. 22, 1978

[30] Foreign Application Priority Data

Oct. 13, 1977 [DE] Fed. Rep. of Germany ....... 2746140
Jul. 4, 1978 [DE] Fed. Rep. of Germany ....... 2829257

[51] Int. Cl.$^2$ .................... B01D 47/00; C08F 8/18; C08F 8/34
[52] U.S. Cl. ................... 264/22; 204/159.14; 204/159.18; 204/159.19; 264/129; 528/171; 528/204
[58] Field of Search .............. 528/204, 171; 204/159.14, 159.19, 159.18; 264/22, 129

[56] References Cited

U.S. PATENT DOCUMENTS

| | | | |
|---|---|---|---|
| 3,150,066 | 9/1964 | Schnell et al. ................. | 204/159.19 |
| 3,453,237 | 7/1969 | Borden et al. ................. | 260/47 |
| 3,518,175 | 6/1970 | Bell ................................. | 204/159.19 |
| 3,600,288 | 8/1971 | Viventi .......................... | 204/159.13 |
| 3,622,331 | 11/1971 | Thomas ......................... | 96/63 |
| 3,775,367 | 11/1973 | Nouverné ...................... | 260/45.9 R |
| 3,787,302 | 1/1974 | Ijichi et al. .................... | 204/159.2 |
| 3,789,052 | 1/1974 | Klebe et al. ................... | 260/47 CZ |
| 3,879,347 | 4/1975 | Serini et al. .................. | 260/47 XA |
| 3,879,348 | 4/1975 | Serini et al. .................. | 260/47 XA |
| 3,892,889 | 7/1975 | Cohnen et al. ................ | 427/160 |
| 3,912,687 | 10/1975 | Haupt et al. ................... | 260/47 X |
| 4,101,399 | 7/1978 | Costanza et al. .............. | 204/159.19 |
| 4,129,612 | 12/1978 | Serini et al. .................. | 260/860 |

FOREIGN PATENT DOCUMENTS 1099732 8/1961 Fed. Rep. of Germany .
2401630 1/1973 Fed. Rep. of Germany .

Primary Examiner—Richard B. Turer
Attorney, Agent, or Firm—Gene Harsh; Lawrence S. Pope

[57] ABSTRACT

The present invention relates to a process for the modification of thermoplastic aromatic polycarbonates containing aromatically bonded halogen, primary alkyl, secondary alkyl and/or alkenyl substituents, characterized in that these polycarbonates are irradiated with UV light, after adding between about 1 and 5% by weight, preferably between about 1 and 3% by weight, relative to the weight of polycarbonate, of photoinitiators and optionally between about 0.05 and 5% by weight, preferably between about 0.1 and 2% by weight, relative to the weight of polycarbonate, of flame-proofing agents. The present invention also relates to the modified polycarbonates obtainable by the process according to the invention.

12 Claims, No Drawings

MODIFIED POLYCARBONATES AND A PROCESS FOR THEIR PREPARATION

BACKGROUND OF THE INVENTION

Polycarbonates obtained from aromatic dihydroxy compounds are known and, because of their interesting technological properties, have found acceptance in many fields of use. However, their sensitivity to organic solvents and stress cracking is still a certain disadvantage in specific applications.

Polycarbonates which carry methyl substituents (German Published Patent Specification No. 2,063,050) which corresponds to U.S. Pat. No. 3,879,348, halogen substituents (U.S. Pat. No. 3,062,781) or unsaturated substituents (U.S. Pat. No. 3,692,870) on the aromatic ring are already known in the art.

It is also known in the art to cross-link special polycarbonates with electron rays (see German Published Patent Specification No. 2,615,038 and the corresponding U.S. Pat. No. 4,129,612.

It has now surprisingly been found that thermoplastic aromatic polycarbonates containing aromatically bonded halogen, primary alkyl, secondary alkyl and/or alkenyl substituents can be modified by irradiation with UV light, after adding between about 1 and 5% by weight, preferably between about 1 and 3% by weight, relative to the weight of polycarbonate, of photoinitiators, so that they acquire an outstanding resistance to organic solvents and a high resistance to stress cracking. Furthermore, the modified polycarbonates can be rendered extremely flame-resistant (VO according to UL Subject 94) in a simple manner by admixing a flame-proofing agent before the UV irradiation.

SUMMARY OF THE INVENTION

The present invention relates to a process for the modification of thermoplastic aromatic polycarbonates containing aromatically bonded halogen, primary alkyl, secondary alkyl and/or alkenyl substituents, characterized in that these polycarbonates are irradiated with UV light, after adding between about 1 and 5% by weight, preferably between about 1 and 3% by weight, relative to the weight of polycarbonate, of photoinitiators and optionally between about 0.05 and 5% by weight, preferably between about 0.1 and 2% by weight, relative to the weight of polycarbonate, of flame-proofing agents, an irradiation time between about 15 seconds and 180 seconds preferably being observed. The present invention also relates to modified polycarbonates obtainable by the process according to the invention.

The present invention preferably relates to the process for the modification of thermoplastic aromatic polycarbonates containing aromatically bonded halogen, primary alkyl, secondary alkyl and/or alkenyl substituents which are prepared in a known manner from (a) between about 0–95 mol % (relative to the sum of the mols of diphenols I and II) of diphenols of the formula I

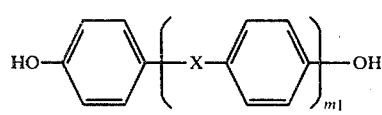

(b) between about 5 and 100 mol % (relative to the sum of the mols of diphenols I and II) of diphenols of the formula II

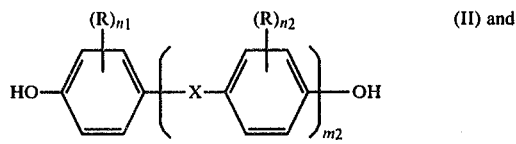

(c) between about 1 and 5 mol % (relative to the sum of the mols of diphenols I and II) of monophenols of the formula III

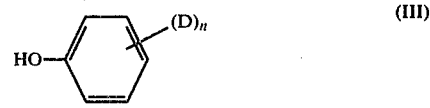

and to the modified polycarbonates obtainable therefrom by the process according to the invention.

DETAILED DESCRIPTION OF THE INVENTION

In the formulae I, II and III,

X denotes a single bond, $C_1$–$C_8$-alkylene, $C_2$–$C_8$-alkylidene, $C_5$–$C_{15}$-cycloalkylene, $C_5$–$C_{15}$-cycloalkylidene, O, S, SO, $SO_2$ and

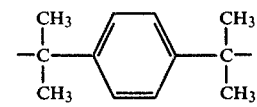

R denotes halogen, for example chlorine or bromine, primary alkyl, for example with 1–18 C atoms, secondary alkyl, for example with 3 to 18 C atoms, and alkenyl, for example with 2–18 C atoms, $m_1, m_2$ denote 0 or 1, in particular 1, $n_1$ and $n_2$ denote integers between 0 and 4, preferably 1 to 2 and in particular 2, and the sum $n_1$ and $n_2$ should be at least 1 in each case, D denotes hydrogen, halogen, for example chlorine or bromine, alkyl, for example with 1–18 C atoms, and $\beta,\gamma$-unsaturated alkyl, for example with 3 to 18 C atoms, and n denotes an integer from 1 to 5.

Examples of primary alkyl radicals R are methyl, ethyl, propyl, butyl, isobutyl, pentyl, isoamyl, neopentyl, dodecyl and stearyl.

Examples of secondary alkyl radicals R are isopropyl, sec.-butyl, 2-octyl and 2-octadecyl.

Examples of alkenyl radicals R are vinyl, isopropentyl, allyl, methallyl, crotyl, buten-1-yl, isobutenyl, penten-1-yl, 2-methyl-buten-1-yl, 3-methyl-buten-1-yl and octen-1-yl.

Examples of the alkyl radicals D are the primary and secondary alkyl radicals R, and in addition also tert.-alkyl radicals, such as tert.-butyl or tert.-amyl.

Examples of $\beta,\gamma$-unsaturated alkyl are allyl, methallyl and crotyl.

The thermoplastic aromatic polycarbonates which contain aromatically bonded halogen, primary alkyl, secondary alkyl and/or alkenyl substituents and are suitable for modification have average molecular weights $\overline{M}w$ between about 10,000 and 200,000, determined by means of gel chromatography after prior calibration.

Both homopolycarbonates and copolycarbonates are suitable. The minimum number of aromatically bonded halogen, primary alkyl, secondary alkyl and alkenyl substituents, which are important for the UV irradiation, depends on the one hand on the nature and amount of the photoinitiator added, and on the irradiation time and irradiation intensity. Under the above-mentioned modification conditions, at least 2 of these aromatically bonded substituents, for example, are generally required in the polycarbonate molecule to be irradiated. In principle, the maximum number of these aromatically bonded substituents is not limited, but its natural limit is given by the ease of preparation of the polycarbonates to be modified.

Examples of suitable diphenols for the preparation of the thermoplastic aromatic polycarbonates suitable for modification are hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones and α,α'-bis-(hydroxyphenyl)-diisopropylbenzenes, and compounds thereof which are nuclear-halogenated, alkylated by primary alkyl groups, alkylated by sec.-alkyl groups and nuclear-alkenylated.

Diphenols of this type are described, for example, in U.S. Pat. Nos. 3,028,365, 3,692,870, 2,999,835, 3,148,172, 3,271,368, 2,991,273, 3,271,367, 3,280,078, 3,014,891 and 2,999,846; German Published Patent Specification Nos. 1,570,703, 2,063,050 which corresponds to U.S. Pat. No. 3,879,348, 2,036,052, 2,211,956 and 2,211,957 which corresponds to U.S. Pat. No. 3,879,349; French Pat. No. 1,561,518 and in the monograph "H. Schnell, Chemistry and Physics of Polycarbonates," Interscience Publishers, New York, 1964.

Examples of preferred diphenols according to formula I are hydroquinone, 4,4'-dihydroxydiphenyl, 2,2-bis-(4-hydroxyphenyl)-propane, 2,4-bis-(4-hydroxyphenyl)-2-methylbutane, bis-(4-hydroxyphenyl) ether, bis-(4-hydroxyphenyl) sulphide, bis-(4-hydroxyphenyl) sulphone, 1,1-bis-(4-hydroxyphenyl)-cyclohexane, 1,1-bis-(4-hydroxyphenyl)-propane, 1,1-bis-(4-hydroxyphenyl)-butane, bis-(4-hydroxyphenyl)-methane and α,α'-bis-(4-hydroxyphenyl)-p-diisopropylbenzene.

Examples of particularly preferred diphenols according to formula I are 2,2-bis-(4-hydroxyphenyl)-propane, bis-(4-hydroxyphenyl) ether, bis-(4-hydroxyphenyl) sulphide and bis-(4-hydroxyphenyl) sulphone.

Examples of preferred diphenols according to formula II are: allylhydroquinone, diallylhydroquinone, 2,2-bis-(3-allyl-4-hydroxyphenyl)-propane, 3,3'-diallyl-4,4'-dihydroxydiphenyl, 3-allyl-4,4'-dihydroxydiphenyl, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols according to formula II are 2,2-bis-(3-allyl-4-hydroxyphenyl)-propane, 2,2-bis-(3,5-dimethyl-4-hydroxyphenyl)-propane, 2,2-bis-(3,5-dichloro-4-hydroxyphenyl)-propane and 2,2-bis-(3,5-dibromo-4-hydroxyphenyl)-propane.

Any desired mixtures of the above mentioned diphenols can also be used.

Suitable monophenols according to formula III include phenol, halogenophenols, alkyl-phenols and phenols containing β, γ-unsaturated alkyl radicals.

Preferred monophenols according to formula III are phenol, 2,4-dimethylphenol, p-isopropylphenol, p-tert.-butylphenol, p-allyl-phenyl, 2,4-dichlorophenol, 4-chlorophenol, 4-bromophenol and 2,4,6-tribromophenol.

The thermoplastic aromatic polycarbonates suitable for modification can be branched by incorporating small amounts, preferably amounts between about 0.05 and 2.0 mol % (relative to diphenols employed), of compounds which are trifunctional or more than trifunctional, in particular those with three or more than three phenolic hydroxyl groups. Polycarbonates of this type are described, for example, in German Published Patent Specification Nos. 1,570,533, 1,595,762, 2,116,974, 2,113,347 and 2,500,092; British Pat. No. 1,079,821; and in U.S. Pat. No. 3,544,514.

The preparation of the polycarbonates which can be modified according to the invention can essentially be carried out by the following two well-known processes (compare "H. Schnell, Chemistry and Physics of Polycarbonates," Polymer Rev., volume IX, page 27 et seq., Interscience Publishers): 1. In a heterogeneous phase system (by the phase boundary process) and 2. In a homogeneous phase (by the so-called pyridine process).

In principle, all the photoinitiators which are compatible with polycarbonates are suitable for the process, according to the invention, for the modification of the polycarbonates, thus, for example, photoinitiators based on aliphatic and aromatic ketones in the broadest sense, such as, for example, including glyoxalates and quinones. Examples of ketones in the narrower sense and glyoxalates are acetophenone, benzil, benzoin, benzoin methyl ether, benzoin isopropyl ether, benzophenone, p-chlorobenzophenone, p-benzoylbenzophenone, dibenzalacetone, benzoylacetone, benzylacetone, deoxybenzoin, 2,4-dimethylbenzophenone, 2,5-dimethylbenzophenone, 3,4-dimethylbenzophenone, 4-benzoyldiphenyl, 9-fluorenone, 4,4-bis-(dimethylamino)-benzophenone, 4-dimethylaminobenzophenone, dibenzyl ketone, 4-methylbenzophenone, propiophenone, benzanthrone, ethylphenyl glyoxalate, tert.-butylphenyl glyoxalate, trimethylsilylphenyl glyoxalate and others.

The aromatic ketones and glyoxalates are preferred. Benzophenone, benzoin, p-benzoylbenzophenone, tert.-butylphenyl glyoxalate and trimethylsilylphenyl glyoxalate are particularly preferred.

Quinones can also be used as the photoinitiators, for example: anthraquinone, 1-chloroanthraquinone, 2-chloroanthraquinone, 2-ethylanthraquinone, 1-methylanthraquinone, 2-methylanthraquinone, 2-phenylanthraquinone and others. Preferred quinones are 2-methylanthraquinone, 2-chloroanthraquinone and 2-ethylanthraquinone.

Other suitable photoinitiators are known to the expert and can be seen from the following publications: J. Kosar, "Light-Sensitive Systems," John Wiley & Sons, New York, 1965, Chapters 4 ("Unsaturated Compounds"), 5 ("Photopolymerization Processes") and 8 (Photopolymerization of Vinyl Monomers), "Chem. Revs." 68, 125-151 (1968); J. F. Rabek "Photosensitized Processes in Polymer Chemistry: A. Review,"

Photchem. Photobiol. 7, 5–57 (1968); G. Delzenne, "Sensitizers of Photopolymerization," Ind. Chim. Belge 24, 739–764 (1959); and C. M. McCloskey and J. Bond, "Photosensitizers for Polyestervinyl Polymerization," Ind. Eng. Chem. 47, 2,125–2,129 (1955).

The UV irradiation required for the process, according to the invention, for the modification of the polycarbonates is effected by means of UV light, using commercially available UV lamps, for example Philips HTQ 4 or 7, Hanovia lamps and others. The irradiation time is about 15 to 180 seconds, depending on the content of photoinitiators employed and on the nature of the sample.

Examples of suitable flameproofing agents for the process, according to the invention, for the modification of the polycarbonates are the compounds, and substances having a synergistic action, to be used which are known and suitable for rendering polycarbonates flame-resistant, such as are described in German Published Patent Specification Nos. 2,049,358 and 2,253,072; U.S. Pat. Nos. 3,775,367 and 3,836,490; and other literature sources.

Examples of suitable compounds are alkali metal salts, in particular those which are soluble in polycarbonate, such as, for example, potassium isooctanate, sodium isooctanate, lithium isooctanate, potassium perfluorooctanate, sodium perfluorooctanate, lithium perfluorooctanate, potassium salts of 5-ethyl-dioxan-1,3-yl-5-carboxylic acid, rubidium isooctanate, rubidium perfluorooctanate and the alkali metal salts of perfluoroalkanesulphonic acid, such as potassium perfluoromethanesulphonate, potassium perfluorooctanesulphonate and potassium perfluorobutanesulphonate.

The alkali metal salts of lauric acid, stearic acid, oleic acid, phthalic acid monobenzyl ester, adipic acid monobutyl ester, p-octylbenzoic acid, p-tert.-butylbenzoic acid, 3-(3,5-di-tert.-butyl-4-hydroxyphenyl)-propionic acid and of diglycolic acid monodecyl ester can also be used.

The process, according to the invention, for the modification of the polycarbonates is carried out in two stages. The first stage is the incorporation of the photoinitiator and optionally a flameproofing agent via (a) solution and isolation as a film, or via (b) compounding between about 280° and 330° C., and optionally molding the polycarbonate into sheets or other injection molded parts; and the second stage is the UV irradiation until cross-linking is effected.

Further variables of the inventive process for the modification of the polycarbonates are, optionally after the addition of flame retardants, dipping or spraying the respective polycarbonate molded parts in the well known method, e.g. analogous to the process of U.S. Pat. No. 3,892,889, utilizing solutions of the photoinitiators to be used in solvents which are inert toward the polycarbonate. The quantity of the photoinitiator to be applied depends mainly on the surface to be cross-linked and the structure of the polycarbonate molded parts as well as the intensity of the desired cross-linking reaction. The quantities of photoinitiator to be applied to the polycarbonate surface are in the magnitude of $10^{-3}$ g/cm$^2$ for an average 100μ surface layer to be cross-linked. The polycarbonate molded parts treated in this method are then dried in a well-known method and modified with UV radiation.

Sources of other high-energy rays, for example, electron rays, particularly cathode rays may also be used for irradiation for the process of the present invention after suitable sensitization.

The modified polycarbonate molding compositions obtainable according to the invention are resistant to organic solvents and, compared with conventional polycarbonates, are distinguished by an improved resistance to stress cracking. If flameproofing agents are added to them, products evaluated as VO according to UL Subject 94 are obtained even with small additions.

The modified polycarbonates obtainable according to the invention can be employed as films and shaped articles in all cases where high resistance to organic solvents coupled with high resistance to stress cracking is required.

The Examples which follow are intended to illustrate the subject of the invention in more detail. The relative viscosities indicated were measured in methylene chloride at 25° C. and at a concentration of 5 g/l.

EXAMPLES

EXAMPLE 1

Preparation of a high-molecular copolycarbonate from 2,2-bis-(3,5-dimethyl-4-hydroxyphenyl)-propane and 2,2-bis-(4-hydroxyphenyl)-propane (95/5 molar parts) using the chain stopper 2,6-dimethylphenol.

18.4 g (0.46 mol) of NaOH are dissolved in 600 ml of water, and 600 ml of methylene chloride, 54 g (0.19 mol) of 2,2-bis-(3,5-dimethyl-4-hydroxyphenyl)-propane, 2.3 g (0.01 mol) of 2,2-bis-(4-hydroxyphenyl)-propane and 0.585 g (0.0048 mol) of 2,6-dimethylphenol are then added, while stirring. 49.5 g (0.5 mol) of gaseous phosgene are then passed in, while stirring vigorously. After passing in the phosgene, 2.02 g (0.02 mol) of triethylamine are added and the mixture is stirred vigorously for 3 hours. The entire reaction is carried out under nitrogen and at 20°–25° C. By adding 50% strength NaOH dropwise, a pH value of 11–13 is maintained while passing in the phosgene, and a pH value of 13 is maintained after adding the triethylamine. After the subsequent stirring, the mixture is worked up. The organic phase is diluted with 1 l of methylene chloride and then washed twice with 1 l of 5% strength aqueous phosphoric acid and then with water until free from electrolytes.

Working up is carried out by evaporating off the solvent in suitable devolatilization units, such as, for example, a devolatalization screw. The relative solution viscosity is 1.30. The molecular weight, $\overline{M}w$, (weight-average) resulting therefrom is 38,000.

EXAMPLE 2

A polycarbonate is prepared from 87 mol % of 2,2-bis-(4-hydroxyphenyl)-propane, 10 mol % of 2,2-bis-(3-allyl-4-hydroxyphenyl)-propane and 3 mol % of p-tert.-butylphenol by the process described in Example 1. The relative solution viscosity is 1.30. The molecular weight, $\overline{M}w$, (weight-average) resulting therefrom is 40,000.

EXAMPLE 3

A polycarbonate is prepared from 86.5 mol % of 2,2-bis-(4-hydroxyphenyl)-propane, 10 mol % of 2,2-bis-(3,5-dichloro-4-hydroxyphenyl)-propane and 3.5 mol % of 2,4-dimethylphenol by the process described in Example 1. The relative solution viscosity is 1.30. The molecular weight, $\overline{M}w$, (weight-average) resulting therefrom is 40,000.

EXAMPLE 4 (Comparison Example)

A polycarbonate is prepared from 2,2-bis-(4-hydroxyphenyl)-propane and p-tert.-butylphenol, as the chain regulator, by the process described in Example 1. The relative solution viscosity is 1.29. The molecular weight, $\overline{M}w$, (weight-average) resulting therefrom is 32,000.

The polycarbonates from Examples 1 to 4 are dissolved in methylene chloride and, after adding 2% by weight of benzophenone, are processed to films 100μ thick and dried overnight at 120° C. The films are then irradiated on both sides with a Philips HTQ 4 UV lamp (high-pressure mercury vapor lamp) at a distance of about 15 cm for 15 and 180 seconds. The films are treated with methylene chloride and the cross-linked portions are filtered off as insoluble fibrils or pieces of film and, after drying, are determined gravimetrically.

As a result of the different cross-linking of the polycarbonates of Examples 1 to 4, the films undergo different stress cracking. For the measurement, strips of film 1 cm wide and 100μ thick are curved to form a loop with a radius of 3 cm and the loop is immersed in carbon tetrachloride.

The time until the loops of film break as a result of stress cracking occurring is recorded. The results are summarized in Table I.

TABLE I

| | Irradiation Time Seconds | Insoluble Portion % | Resistance in Carbon Tetrachloride Seconds |
|---|---|---|---|
| Example 1 | 15 | 20 | 40 |
| | 180 | 60 | 90 |
| Example 2 | 120 | 75 | 180+ |
| Example 3 | 180 | 70 | 180+ |
| Example 4 (Comparison Example) | 180 | — | <1 |

+the test was discontinued after 180 seconds.

EXAMPLE 5

3,916 g of the polycarbonate from Example 1 are mixed together with 80 g (2% by weight) of p-benzylbenzophenone and 4 g (0.1% by weight) of potassium perfluorobutanesulphonate at 310° C. in a twin-screw machine and the mixture is extruded.

EXAMPLE 6

3,876 g of the polycarbonate from Example 2 are mixed with 120 g (3% by weight) of benzophenone and 4 g (0.1% by weight) of potassium perfluorobutanesulphonate at 310° C. in a twin-screw machine and the mixture is extruded.

EXAMPLE 7

3,916 g of the polycarbonate from Example 3 are mixed with 80 g (2% by weight) of benzophenone and 4 g (0.1% by weight) of potassium perfluorobutanesulphonate at 310° C. in a twin-screw machine and the mixture is granulated.

EXAMPLE 8 (Comparison Example)

3,876 g of the polycarbonate from Example 4 are mixed with 120 g (3% by weight) of benzophenone and 4 g (0.1% by weight) of potassium perfluorobutanesulphonate at 310° C. in a twin-screw machine and the mixture is extruded.

The modified polycarbonates from Examples 5, 6, 7 and 8 are injection-molded to standard test bars and the bars are irradiated on both sides with a Philips HTQ 4 high-pressure mercury vapor lamp at a distance of about 15 cm for 45 seconds. The test pieces are then tested in accordance with UL Subject 94.

TABLE 2

| | UL Subj. 94 | |
|---|---|---|
| | ⅛" | 1/16" |
| Example 5 | V O | V O |
| Example 6 | V O | V O |
| Example 7 | V O | V O |
| Example 8 (Comparison Example) | V 2 | V 2 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the modification of a thermoplastic aromatic polycarbonate prepared from
   a) between about 0 and 95 mol % of diphenols of the general formula (I)

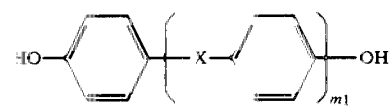

b) between about 5 and 100 mol % of diphenols of the general formula (II)

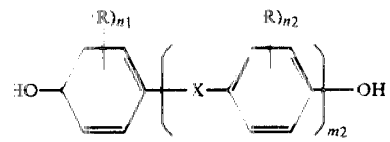

c) between about 1 and 5 mol % of monophenols of the general formula (III)

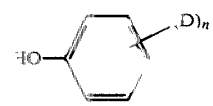

the mol percentages being relative to the sum of the mols of diphenols I and II, wherein
X denotes a single bond or a $C_1$ to $C_8$ alkylene, $C_2$ to $C_8$ alkylidene, $C_5$ to $C_{15}$ cycloalkylene, $C_5$ to $C_{15}$ cycloalkylidene, O, S, SO, $SO_2$ or

radical,

R denotes a halogen atom or a primary alkyl, secondary alkyl or alkenyl radical,
$m_1, m_2$—0 or 1, $n_1$ and $n_2$ are 0, 1, 2, 3 or 4, and the sum of $n_1$ and $n_2$ must be at least 1 in each case, n is 1, 2, 3, 4 or 5 and D denotes a hydrogen or halogen atom or an alkyl or $\beta,\gamma$-unsaturated alkyl radical comprising irradiating the polycarbonates with UV light, after adding between about 1% and 5% by weight, relative to the weight of polycarbonate, of a photoinitiator.

2. The process according to claim 1, wherein between about 1% and 3% by weight of the photoinitiator is added to the polycarbonate.

3. The process according to claim 1, wherein between about 0.05% and 5% by weight, relative to the weight of polycarbonate, of a flameproofing agent is added prior to the irradiation.

4. The process according to claim 3, wherein between about 0.1% and 2% by weight of the flameproofing agent is added prior to irradiation.

5. The process according to claim 1, wherein R is a $C_1$ to $C_{18}$ primary alkyl radical, a $C_3$ to $C_{18}$ secondary alkyl radical or $C_2-C_{18}$ alkenyl radical, $m_1$ and $m_2$ are 1, $n_1$ and $n_2$ are 1 or 2 and D is a hydrogen, chlorine or bromine atom or a $C_1$ to $C_{18}$ alkyl or $C_3$ to $C_{18}$ $\beta,\gamma$-unsaturated alkyl radical.

6. The process according to claim 5, wherein $n_1$ and $n_2$ are 2.

7. The process of claim 1, wherein the photoinitiator is added via solution and the polycarbonate is isolated as a film.

8. The process of claim 1, wherein the photoinitiator is added via compounding between about 280° and 330° C.

9. The process of claim 1, wherein the photoinitiator-containing polycarbonate is molded into sheets or other injection molded parts prior to irradiation.

10. A process for cross-linking thermoplastic aromatic polycarbonates prepared from (a) between about 0 and 95 mol % of diphenols of the general formula (I)

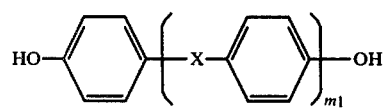
(I)

(b) between about 5 and 100 mol % of diphenols of the general formula (II)

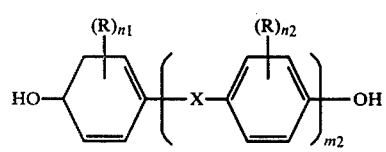
(II) and (c) between about 1 and 5 mol % of the monophenols of the general formula (III)

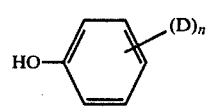
(III)

the mol percentages being relative to the sum of the mols of diphenols I and II, wherein X denotes a single bond or a $C_1$ to $C_8$ alkylene, $C_2$ to $C_8$ alkylidene, $C_5$ to $C_{15}$ cycloalkylene, $C_5$ to $C_{15}$ cycloalkylidene, O, S, SO, $SO_2$ or

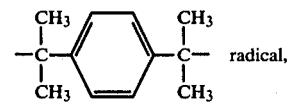 radical,

R denotes a halogen atom or a primary alkyl, secondary alkyl or alkenyl radical, $m_1, m_2$—0 or 1, $n_1$ and $n_2$ are 0, 1, 2, 3, or 4, and the sum of $n_1$ and $n_2$ must be at least 1 in each case, n is 1, 2, 3, 4 or 5 and D denotes a hydrogen or halogen atom or an alkyl or $\beta,\gamma$-unsaturated alkyl radical comprising (a) molding the polycarbonate into sheets or other injection molded parts;

(b) dipping or spraying said polycarbonate sheets or molded parts in or with solvent mixtures of photoinitiators characterized in that the solvents are inert toward said polycarbonate, (c) drying the polycarbonate sheet or molded parts, and (d) irradiating with UV light.

11. Modified polycarbonates produced by the process of claim 1 and 10.

12. A process for the modification of a thermoplastic aromatic polycarbonate prepared from (a) between about 0 and 95 mol % of diphenols of the general formula (I)

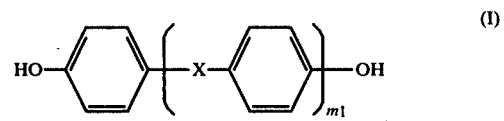
(I)

(b) between about 5 and 100 mol % of diphenols of the general formula (II)

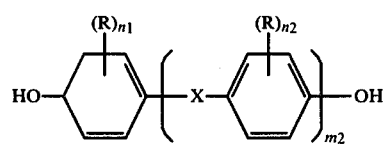
(II) and (c) between about 1 and 5 mol % of monophenols of the general formula (III)

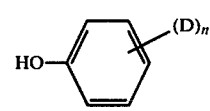
(III)

the mol percentages being relative to the sum of the mols of diphenols I and II, wherein X denotes a single bond or a $C_1$ to $C_8$ alkylene, $C_2$ to $C_8$ alkylidene, $C_5$ to $C_{15}$ cycloalkylene, $C_5$ to $C_{15}$ cycloalkylidene, O, S, SO, $SO_2$ or

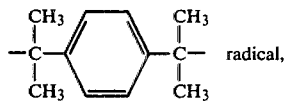 radical,

R denotes a primary alkyl, secondary alkyl or alkenyl radical, $m_1, m_2$—0 or 1, $n_1$ and $n_2$ are 0, 1, 2, 3 or 4, and the sum of $n_1$ and $n_2$ must be at least 1 in each case, n is 1, 2, 3, 4 or 5 and D denotes a hydrogen or an alkyl or $\beta,\gamma$-unsaturated alkyl radical comprising irradiating the polycarbonates with UV light, after adding between about 1% and 5% by weight, relative to the weight of polycarbonate, of a photoinitiator.

* * * * *